(12) United States Patent
Xu et al.

(10) Patent No.: US 11,293,832 B2
(45) Date of Patent: Apr. 5, 2022

(54) LARGE-AMPLITUDE VERTICAL-TORSIONAL COUPLED FREE VIBRATION TESTING DEVICE FOR BRIDGES IN NATURAL WINDS

(71) Applicant: DALIAN UNIVERSITY OF TECHNOLOGY, Liaoning (CN)

(72) Inventors: Fuyou Xu, Liaoning (CN); Mingjie Zhang, Liaoning (CN); Zhaoyu Ma, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 8 days.

(21) Appl. No.: 17/055,089

(22) PCT Filed: Aug. 5, 2019

(86) PCT No.: PCT/CN2019/099186
§ 371 (c)(1),
(2) Date: Nov. 12, 2020

(87) PCT Pub. No.: WO2020/258449
PCT Pub. Date: Dec. 30, 2020

(65) Prior Publication Data
US 2021/0172830 A1   Jun. 10, 2021

(30) Foreign Application Priority Data

Jun. 28, 2019 (CN) .......................... 201910576355.8

(51) Int. Cl.
*G01M 7/02* (2006.01)
*G01M 9/00* (2006.01)

(52) U.S. Cl.
CPC .............. *G01M 7/027* (2013.01); *G01M 9/00* (2013.01)

(58) Field of Classification Search
CPC .......... G01M 7/027; G01M 7/06; G01M 7/08; G01M 9/00; G01M 9/02; G01M 9/04; G01M 9/062
See application file for complete search history.

(56) References Cited

U.S. PATENT DOCUMENTS

2019/0219475 A1* 7/2019 Xu ...................... G01M 5/0008
2020/0232875 A1* 7/2020 Xu .......................... G01M 9/02

FOREIGN PATENT DOCUMENTS

CN         203929356 U      11/2014
CN         107345846 A      11/2017
                (Continued)

*Primary Examiner* — Suman K Nath
(74) *Attorney, Agent, or Firm* — Muncy, Geissler, Olds & Lowe, P.C.

(57) ABSTRACT

The present invention provides large-amplitude vertical-torsional coupled free vibration testing device for bridges in natural winds, which comprises a rigid model, light-weight high-strength thin strings, linear extension springs, a rigid framework, spring protection tubes, a turntable, a rigid column, a motor, heavy blocks, and rigid thin circular rods. Based on the device, free vibration tests of a bridge deck rigid model can be carried out in natural wind with good conditions, and hence the large-scale wind tunnel device is no longer required. The scaling ratio of the rigid model is no longer limited by the wind tunnel size as in a traditional test, and the scaling ratio can be much larger. Compared with traditional wind tunnel test, the device is more suitable for large-amplitude vibration tests since it can reduce the geometrical nonlinearities of the extension springs and the blocking ratio.

8 Claims, 1 Drawing Sheet

(56) References Cited

FOREIGN PATENT DOCUMENTS

| | | |
|---|---|---|
| CN | 206772547 U | 12/2017 |
| CN | 107588923 A | 1/2018 |
| CN | 108225715 A | 6/2018 |
| CN | 108414186 A | 8/2018 |
| JP | H01-240835 A | 9/1989 |
| JP | 2001-041846 A | 2/2001 |

* cited by examiner

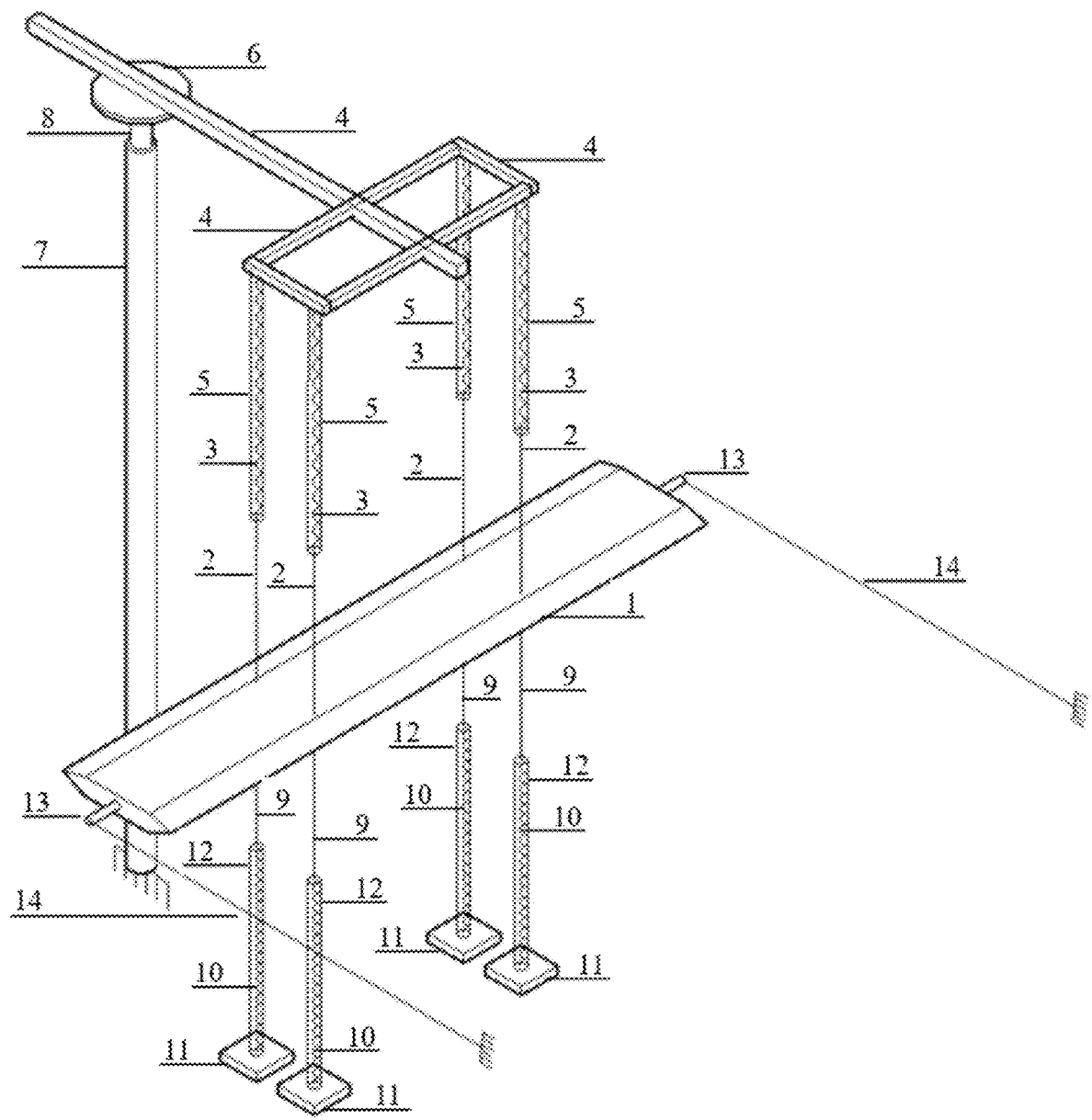

LARGE-AMPLITUDE VERTICAL-TORSIONAL COUPLED FREE VIBRATION TESTING DEVICE FOR BRIDGES IN NATURAL WINDS

TECHNICAL FIELD

The present invention relates to a testing device to study large-amplitude vertical-torsional coupled free vibrations of large-scale rigid models of bridge decks, which is not used in wind tunnel laboratory, but used in natural wind fields. Specifically, a large-scale rigid model is suspended on a turntable installed on a tower through light-weight high-strength thin strings and linear extension springs. The tower is located at an open area with good wind conditions. The suspending system of the rigid model can be rotated by the turntable which is driven by a motor to adjust the wind yaw angle of the rigid model relative to oncoming wind flow. Consequently, the status of bridge deck relative to the wind flow can be simulated. Since the device is located in a natural wind environment, the scaling ratio of the rigid model is no longer limited by the wind tunnel size as in traditional tests, and large-scale model tests can be conducted. In addition, compared to traditional wind tunnel testing method, the new testing method has the following advantages: it can conveniently achieve large-amplitude vibration and arbitrary wind yaw angle, it is energy saving, and it is unnecessary to occupy a wind tunnel laboratory.

BACKGROUND

Vertical-torsional coupled free vibration test of rigid model of bridge deck is an important method to study the wind-induced vibration (including vortex-induced vibration, buffeting, galloping, and flutter) of bridges. It is also one common testing method to identify flutter derivatives of bridge decks. Traditionally, vertical-torsional coupled free vibration test of bridge decks were carried out in a wind tunnel laboratory, where the wind speed is controllable and the wind flow quality is fine. The spring-suspending system can be classified as the inner framework and outer framework. An outer framework is located outside the wind tunnel walls, and the suspending arms and springs are hence free from the wind-induced force. An outer framework is applicable for a wind tunnel with smaller width. The wind tunnel walls can be used as end plates to ensure the two-dimensional flow around the rigid model. For a wider wind tunnel, e.g., >4 in, the model is difficult or even impossible to span across the wind tunnel. In such a case, the framework is required to be placed inside the wind tunnel to support the suspending system. Measures should be taken to prohibit the springs from the wind load. As a result, the experiment difficulty is increased to some extent. Otherwise, if the springs are directly prone to wind loads, the testing accuracy will be affected. Due to the limitation of wind tunnel size, the aspect ratio (length to width) of the testing model is generally lower than 4. Therefore, specially designed end plates or wind tunnel walls on both sides are used to ensure the two-dimensional flow. Usually, only small scaling ratio model tests can be carried out in wind tunnel laboratory. However, it is difficult to accurately simulate the geometry with enough stiffness by a very small-scale rigid model. Sometimes, the simulation requirements of mass and mass moment of inertia are difficult to be satisfied.

In addition, it is difficult to adjust the wind yaw angle by using traditional wind tunnel free vibration testing device. Since the direction of wind flow in wind tunnel is unadjustable, the wind yaw angle can only be adjusted by changing the direction of the rigid model relative to the wind flow. For an outer framework suspending system, it seems impossible to adjust the wind yaw angle. For an inner framework system, the procedure to adjust the wind yaw angle is very complicated, and it is inconvenient to comprehensively investigate the wind-resistance performance under various yaw angle conditions. Furthermore, it is difficult to achieve large-amplitude vibration by a conventional experimental device, due to the following reasons: (1) the extension spring lengths are relatively shorter (usually 40~80 cm), and the springs obviously tilt and the springs geometrical stiffness cannot keep linear for large-amplitude torsional vibrations, which might introduce unacceptable error to the experimental results; (2) the blocking ratio increases with increasing the torsional vibration amplitude, and the blocking ratio might not satisfy the experimental requirement; although the blocking ratio can be reduced by using the small-scale model, it is difficult to accurately simulate the aerodynamic configuration, model stiffness, model mass and mass moment of inertia; (3) tests with large-amplitude vibrations might be dangerous since any unexpected failure of the rigid model could damage the wind tunnel device. If the free-vibration testing device in wind tunnel is moved to the outdoor natural wind fields, adjust some parameters (mainly the sizes), add a driving apparatus to adjust the wind yaw angle, the encountered problems in wind tunnel experiments can be effectively solved.

SUMMARY

The present invention aims at solving a technical problem. According to the requirement of large-amplitude vertical-torsional coupled free vibration tests of bridge deck rigid models, a testing device enables large-amplitude coupled free vibrations at various wind directions in good natural wind fields is provided to effectively solve the bottleneck problem confronted in current wind tunnel tests. The testing device comprises a rigid model, light-weight high-strength thin strings, linear extension springs, spring protection tubes, a rigid framework, a turntable, a rigid column, a motor, heavy blocks, and rigid thin circular rods.

Technical Solution of the Invention

Large-amplitude vertical-torsional coupled free vibration testing device for bridges is installed in an experimental base with good wind environment (e.g., open coastal area, square, rural field, etc.). The wind field of the experimental base satisfies the following conditions: high wind speed, stable wind velocity, low turbulence, and long duration of wind. Experimental basis meet the above conditions are not difficult to be found in areas that are significantly affected by monsoons and/or local land and sea breezes. The testing device includes a rigid model 1, first light-weight high-strength thin string 2, first linear extension spring 3, a rigid framework 4, first spring protection tube 5, a turntable 6, a rigid column 7, a motor 8, second light-weight high-strength thin string 9, the second linear extension spring 10, heavy blocks 11, second spring protection tube 12, rigid thin circular rods 13, and the third light-weight high-strength long thin string 14. The rigid model 1 is connected to the lower end of the first linear extension spring 3 through the first light-weight high-strength thin string 2. The upper end of the first linear extension spring 3 is suspended on the rigid framework 4. The first linear extension spring 3 is placed inside the first spring protection tube 5 to prevent the first linear extension spring 3 from wind-induced force. The first spring protection tube 5 is fixed on the rigid framework 4. The rigid framework 4 is fixed on a turntable 6. The turntable 6 is fixed on the top of a rigid column 7. A motor 8 that fixed on the rigid column 7 is used to drive the motion of the turntable 6, which further drive the motions of the rigid framework 4 and rigid model 1 to adjust the wind yaw angle of rigid model 1. The rigid model 1 is connected to the upper end of the second linear extension spring 10 through the second light-weight high-strength thin string 9. The lower end of the second linear extension spring 10 is supported by heavy blocks 11 on the ground. The position of the heavy blocks 11 can be adjusted according to the position of the rigid model 1, to ensure the second linear extension spring 10 holds vertically straight. The second linear extension spring 10 is placed inside the second spring protection tube 12 to prevent the second linear extension spring 10 from wind-induced force. The second spring protection tube 12 is fixed on the heavy blocks 11. The rigid thin circular rod 13 is fixed at each end of the rigid model 1, the central line of the rigid thin circular rod 13 is in line with that of the rigid model. The lateral motion of the rigid model 1 is restricted by the third light-weight high-strength long thin string 14, while the third light-weight high-strength long thin string 14 provides insignificant effect to the vertical and torsional motion of the rigid model 1. When the rigid model 1 is in its static position, the first light-weight high-strength thin string 2, the first linear extension spring 3, the second light-weight high-strength thin string 9, the second linear extension spring 10, are in line. The distance (along the width of rigid model 1) between the suspending points of the first light-weight high-strength thin string 2, the first linear extension spring 3, the second light-weight high-strength thin string 9, the second linear extension spring 10 on the rigid model 1 are adjustable, by which the ratio of torsional frequency to vertical frequency of rigid model 1 can be adjusted. The changes of wind angle of attack can be realized by adjusting the relative heights of the upstream and downstream suspending points of rigid model 1.

The scaling ratio of the rigid model 1 is not limited by the size of the wind tunnel, the device is applicable for experiments with large scaling ratio, large vibration amplitude, and various wind yaw angles. For the sake of safety and experimental cost, the length of model is within 10~12 in, the width of the model is within 1.0~2.0 in, the aspect ratio is within 5~12, and the equivalent mass of the spring-suspended system is within 500~2000 kg.

The scaling ratio of the rigid model 1 is not limited by the size of the wind tunnel, the device is applicable for vertical-torsional coupled free vibration experiments with large scaling ratio, large vibration amplitude, and various wind yaw angles. The stiffnesses of the first linear extension spring 3 and second linear extension spring 10 are determined by the mass of the rigid model 1 and the desired vertical frequency. The strengths of the first linear extension spring 3 and second linear extension spring 10 are determined by the mass of the rigid model 1, the vertical and torsional amplitudes. The horizontal distance between the suspending points of the first light-weight high-strength thin string 2, the first linear extension spring 3, the second light-weight high-strength thin string 9, and the second linear extension spring 10 is determined by the ratio of torsional frequency to vertical frequency of the rigid model 1 and the radius of gyration of the suspending system. During a large-amplitude free vibration, the first light-weight high-strength thin string 2 and the second light-weight high-strength thin string 9 should keep tensioned, and the first linear extension spring 3 and the second linear extension spring 10 should be in their linear elastic status. During a large-amplitude free vibration, the first light-weight high-strength thin string 2 and the second light-weight high-strength thin string 9 should keep tensioned, and the first linear extension spring 3 and the second linear extension spring 10 should be in their linear elastic status.

The rigid column 7 should be sufficiently high, strong and rigid. For the sake of safety and experimental cost, the rigid column 7 could be constructed by concrete-filled steel tube. The height of the rigid column 7 is 15~20 in, the diameter of the steel tube is 0.8~1.0 in, the wall thickness of the steel tube is 8.0~10.0 mm. If the diameter of the rigid column 7 is too large, the cost will obviously increase, and the wind flow interference effect from the steel tube will be enhanced. If the diameter of the rigid column 7 is too small, the strength and stiffness are difficult to be ensured, and potential danger exists.

The beneficial effects of the present invention: The large-amplitude vertical-torsional coupled free vibration tests of bridge deck rigid models can be carried out in natural wind field with good conditions. The advantages include: (1) an expensive wind tunnel laboratory is no longer required, the cost of the testing device is low; (2) the area of the present device is smaller than 100 $m^2$, which is much smaller than a common wind tunnel; (3) no large-power device is required, and the energy is largely saved; (4) the scaling ratio of the model can be three times of that used in wind tunnel test, and even larger; (5) it is safer to study the large-amplitude coupled free vibration, and the potential danger is reduced; (6) the springs are more than five times longer than those in a wind tunnel test, the nonlinearity originates from spring stiffness is greatly reduced; (7) for the large-amplitude vibration, the large blocking ratio problem encountered in wind tunnel test can be solved; (8) the wind yaw angle can be conveniently adjusted.

DESCRIPTION OF THE DRAWINGS

The sole FIGURE presents a schematic diagram of the large-amplitude vertical-torsional coupled free vibration testing device for bridges in natural wind.

In the FIGURES: 1 rigid model; 2 first light-weight high-strength thin string; 3 first linear extension spring; 4 rigid support; 5 first spring protection tube; 6 turntable; 7 rigid column; 8 motor; 9 second light-weight high-strength thin string; 10 second linear extension spring; 11 heavy block; 12 second spring protection tube; 13 rigid thin circular rod; 14 third light-weight high-strength long thin string.

DETAILED DESCRIPTION

According to the technical scheme and attached drawings, the specific procedure for this invention is described in details as follows:

As presented in the sole FIGURE, the large-amplitude vertical-torsional coupled free vibration testing device for bridges in natural wind, includes a bridge deck rigid model 1, the first light-weight high-strength thin string 2, the first extension springfirst linear extension spring 3, a rigid support 4, the first spring protection tube 5, a turntable 6, a rigid column 7, a motor 8, the second light-weight high-strength thin string 9, the second linear extension spring 10, four heavy blocks 11, the second spring protection tube 12, two rigid thin rods 13, and the third light-weight high-strength long thin string 14. The rigid model 1 is connected to the lower end of the first linear extension spring 3 through the first light-weight high-strength thin string 2. The upper end of the first linear extension spring 3 is suspended on the rigid support 4. The first linear extension spring 3 is placed inside the first spring protection tube 5 to prevent the first linear extension spring 3 from wind-induced load. The first spring protection tube 5 is fixed on the rigid support 4. The rigid support 4 is fixed on the top of a turntable 6. The turntable 6 is fixed on the top of a rigid column 7. The motor 8 is fixed on the rigid column 7 to drive the motion of the turntable 6, which further drive the motions of the rigid support 4 and rigid model 1. Consequently, the rigid model 1 testing angle relative to the wind flow can be adjusted. The rigid model 1 is connected to the upper end of the second linear extension spring 10 through the second light-weight high-strength thin string 9. The lower end of the second linear extension spring 10 is supported by the heavy blocks 11 on the ground. The position of the heavy blocks 11 can be adjusted according to the position of the rigid model 1, to ensure the second linear extension spring 10 holds vertically straight. The second linear extension spring 10 is placed inside the second spring protection tube 12 to prevent the second linear extension spring 10 from wind-induced load. The second spring protection tube 12 is fixed on the heavy block 11. The rigid thin circular rod 13 is fixed at each end of the rigid model 1, and the central line of the rigid thin circular rod 13 is in line with that of the rigid model 1. The lateral motion of the rigid model 1 is restricted by the third light-weight high-strength long thin string 14. The vertical and torsional vibrations of the rigid model 1 are basically not restricted. When the rigid model 1 is in its static position, the first light-weight high-strength thin string 2, the first linear extension spring 3, the second light-weight high-strength thin string 9, the second linear extension spring 10, are vertically in line. The distance (along the width of section model 1) between the suspending points of first light-weight high-strength thin string 2, the first linear extension spring 3, the second light-weight high-strength thin string 9, the second linear extension spring 10 are adjustable, by which the ratio of torisonal frequency to vertical frequency of the rigid model 1 can be adjusted. The wind angle of attack can be changed by adjusting the relative heights of the upstream and downstream suspending points of the rigid model 1.

The invention claimed is:

1. A large-amplitude vertical-torsional coupled free vibration testing device for bridges in natural winds, wherein the large-amplitude vertical-torsional coupled free vibration testing device for bridges in natural winds comprises rigid model, first light-weight high-strength thin string, first linear extension spring, a rigid support, first spring protection tube, a turntable, a rigid column, a motor, second light-weight high-strength thin string, the second linear extension spring, heavy blocks, second spring protection tube, rigid thin circular rods, and third light-weight high-strength long thin string;

the rigid model is connected to the lower end of the first linear extension spring through the first light-weight high-strength thin string;

the upper end of the first linear extension spring is suspended on the rigid support;

the first linear extension spring is placed inside the first spring protection tube to prevent the first linear extension spring from wind-induced load;

the first spring protection tube is fixed on the rigid support;

the rigid support is fixed on the upper surface of a turntable;

the lower surface of the turntable is fixed on the top of a rigid column;

the motor is fixed on the rigid column to drive the motion of the turntable, which further drive the motions of the rigid support and rigid model to adjust the wind yaw angle of the rigid model;

the rigid model is connected to the upper end of the second linear extension spring through the second light-weight high-strength thin string;

the lower end of the second linear extension spring is supported by the heavy blocks on the ground;

the position of the heavy blocks are adjusted according to the position of the rigid model, to ensure the second linear extension spring holds vertically straight;

the second linear extension spring is placed inside the second spring protection tube to prevent the second linear extension spring from wind-induced load;

the second spring protection tube is fixed on the heavy block;

the rigid thin circular rod is fixed at each end of the rigid model, the central line of the rigid thin circular rod is in line with that of the rigid model;

the lateral motion of the rigid model is restricted by the third light-weight high-strength long thin string, while the third light-weight high-strength long thin string provides insignificant effect to the vertical and torsional motion of the rigid model;

when the rigid model is in its static position, the first light-weight high-strength thin string, the first linear extension spring, the second light-weight high-strength thin string, the second linear extension spring, are vertically in line;

the distance, along the width of section model, between the first light-weight high-strength thin string, the first linear extension spring, the second light-weight high-strength thin string, the second linear extension spring are adjustable, by which the ratio of torsional frequency to vertical frequency of the rigid model is adjusted;

the wind angle of attack can be changed by adjusting the relative heights of the upstream and downstream suspending points of the rigid model.

2. The large-amplitude vertical-torsional coupled free vibration testing device for bridges in natural winds according to claim 1, wherein the length of the rigid model is within 10~12 m, the width of the rigid model is within 1.0~2.0 m, the aspect ratio is within 5~12, the equivalent mass the spring-suspended system is within 500~2000 kg.

3. The large-amplitude vertical-torsional coupled free vibration testing device for bridges in natural winds according to claim 1, wherein the stiffnesses of the first linear extension spring and the second linear extension spring are determined by the mass of the rigid model and the desired vertical frequency;

the strengths of the first linear extension spring and second linear extension spring are determined by the mass of the rigid model, the vertical and torsional amplitudes.

4. The large-amplitude vertical-torsional coupled free vibration testing device for bridges in natural winds according to claim 1, wherein the distance between suspending points of the first light-weight high-strength thin string, the first linear extension spring, the second light-weight high-strength thin string and second linear extension spring is determined by the ratio of torsional frequency to vertical frequency of the rigid model;

the horizontal distance between suspending points of the first light-weight high-strength thin string, the first linear extension spring, the second light-weight high-strength thin string and second linear extension spring is determined by the ratio of torsional frequency to vertical frequency and the radius of gyration of the suspending system.

5. The large-amplitude vertical-torsional coupled free vibration testing device for bridges in natural winds according to claim 3, wherein the distance between suspending points of the first light-weight high-strength thin string, the first linear extension spring, the second light-weight high-strength thin string and second linear extension spring is determined by the ratio of torsional frequency to vertical frequency of the rigid model;

the horizontal distance between suspending points of the first light-weight high-strength thin string, the first linear extension spring, the second light-weight high-strength thin string and second linear extension spring is determined by the ratio of torsional frequency to vertical frequency and the radius of gyration of the suspending system.

6. The large-amplitude vertical-torsional coupled free vibration testing device for bridges in natural winds according to claim 1, wherein the rigid column is sufficiently high, strong and rigid;

the rigid column could be constructed by concrete-filled steel tube, the height of the rigid column is 15~20 m, the diameter of the steel tube is 0.8~1.0 m, the wall thickness of the steel tube is 8.0~10.0 mm.

7. The large-amplitude vertical-torsional coupled free vibration testing device for bridges in natural winds according to claim 3, wherein the rigid column is sufficiently high, strong and rigid;

the rigid column could be constructed by concrete-filled steel tube, the height of the rigid column is 15~20 m, the diameter of the steel tube is 0.8~1.0 m, the wall thickness of the steel tube is 8.0~10.0 mm.

8. The large-amplitude vertical-torsional coupled free vibration testing device for bridges in natural winds according to claim 4, wherein the rigid column is sufficiently high, strong and rigid;

the rigid column could be constructed by concrete-filled steel tube, the height of the rigid column is 15~20 m, the diameter of the steel tube is 0.8~1.0 m, the wall thickness of the steel tube is 8.0~10.0 mm.

\* \* \* \* \*